US011160212B2

(12) United States Patent
Hess

(10) Patent No.: US 11,160,212 B2
(45) Date of Patent: Nov. 2, 2021

(54) LAWN MOWER PLOW OR ACCESSORY WARNING DEVICE FOR DIVERTING AND SAVING HONEY BEES AND OTHER ENDANGERED INSECTS

(71) Applicant: James Steven Hess, New Castle, IN (US)

(72) Inventor: James Steven Hess, New Castle, IN (US)

(*) Notice: Subject to any disclaimer, the term of this patent is extended or adjusted under 35 U.S.C. 154(b) by 394 days.

(21) Appl. No.: 15/807,566

(22) Filed: Nov. 8, 2017

(65) Prior Publication Data

US 2019/0133090 A1  May 9, 2019

(51) Int. Cl.
*A01D 75/20* (2006.01)
*A01D 34/81* (2006.01)
*A01M 29/10* (2011.01)
*A01M 29/16* (2011.01)
*A01M 29/28* (2011.01)
*A01M 29/12* (2011.01)
*A01D 101/00* (2006.01)

(52) U.S. Cl.
CPC ............. *A01D 75/20* (2013.01); *A01M 29/10* (2013.01); *A01M 29/12* (2013.01); *A01M 29/16* (2013.01); *A01M 29/28* (2013.01); *A01D 34/81* (2013.01); *A01D 2101/00* (2013.01)

(58) Field of Classification Search
CPC .................................. A01D 75/20; A01D 1/12
USPC ......................................................... 56/320.1
See application file for complete search history.

(56) References Cited

U.S. PATENT DOCUMENTS

| | | | | |
|---|---|---|---|---|
| 1,757,844 A * | 5/1930 | Pol | ......................... | A01D 57/01 56/249 |
| 2,157,620 A * | 5/1939 | McGrath | .............. | A01D 34/001 56/249 |
| 2,972,849 A * | 2/1961 | Ridenour | ............... | A01D 75/20 56/320.2 |
| 3,385,041 A * | 5/1968 | Douglas | ................. | A01D 43/02 56/255 |
| 3,430,421 A * | 3/1969 | Matthews | .............. | A01D 34/02 56/12.9 |
| 4,299,079 A * | 11/1981 | Lambert | .............. | A01D 76/006 56/16.7 |
| 4,864,808 A * | 9/1989 | Weber | .................. | A01D 42/005 56/320.2 |
| 4,989,676 A * | 2/1991 | Rogers | ................... | A01D 42/06 111/197 |
| 5,325,657 A * | 7/1994 | Bevis | .................... | A01D 34/001 56/320.1 |

(Continued)

*Primary Examiner* — Magdalena Topolski
(74) *Attorney, Agent, or Firm* — Ritchison Law Offices, PC; John D Ritchison

(57) ABSTRACT

A lawn mower plow or accessory warning device for diverting and saving honey bees and other endangered insects. The device components include a plate for removably securing the warning device to the mower deck; a manner for removably connecting and securing the plate to the deck; a warning emitter; and a way for securing a warning emitter to the plate Alternative mechanical designs and light, sound, electro-magnetic force and spray devices are shown as alternative embodiments. The warning device alerts the pollinating bees of the oncoming mower so the bees can survive by flying away and averting their demise by the mower. Alternative devices for warning are sound, light, smoke, spray and Electro Magnetic force/pulse generators placed with the mowers.

7 Claims, 10 Drawing Sheets

(56) References Cited

U.S. PATENT DOCUMENTS

| | | | | |
|---|---|---|---|---|
| 6,122,904 | A * | 9/2000 | Garcia de Alba | A01D 42/02 56/16.9 |
| 6,199,356 | B1 * | 3/2001 | Moreno | A01D 42/02 56/193 |
| 8,220,240 | B2 * | 7/2012 | Tielburger | A01D 43/02 56/193 |
| 9,320,202 | B2 * | 4/2016 | Houseman | A01D 43/00 |
| 9,839,176 | B1 * | 12/2017 | Snyder | A01B 76/00 |
| 2003/0000195 | A1 * | 1/2003 | Watkins | A01D 42/005 56/320.1 |
| 2006/0123760 | A1 * | 6/2006 | Glasscock | A01D 34/67 56/17.3 |
| 2006/0236670 | A1 * | 10/2006 | Glasford | A01D 43/02 56/257 |
| 2015/0096277 | A1 * | 4/2015 | Muffie | A01K 29/00 56/12.8 |
| 2016/0014953 | A1 * | 1/2016 | Tillman | A01D 75/20 56/320.1 |

* cited by examiner

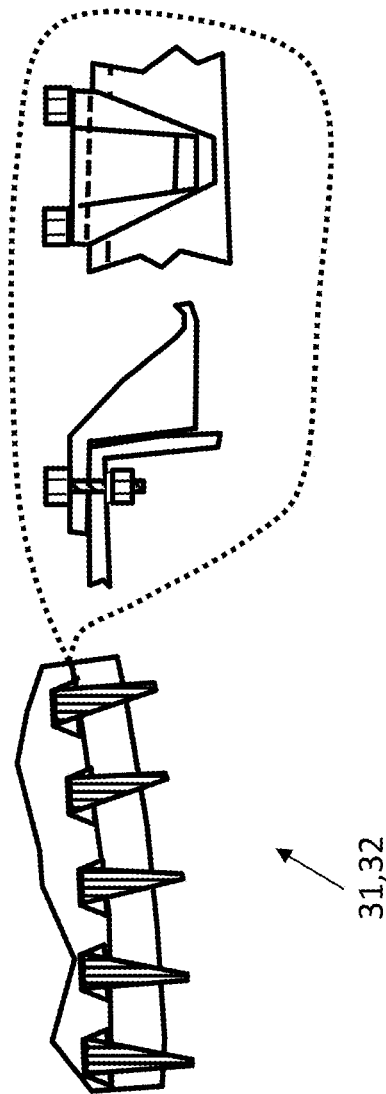
Fig. 1A
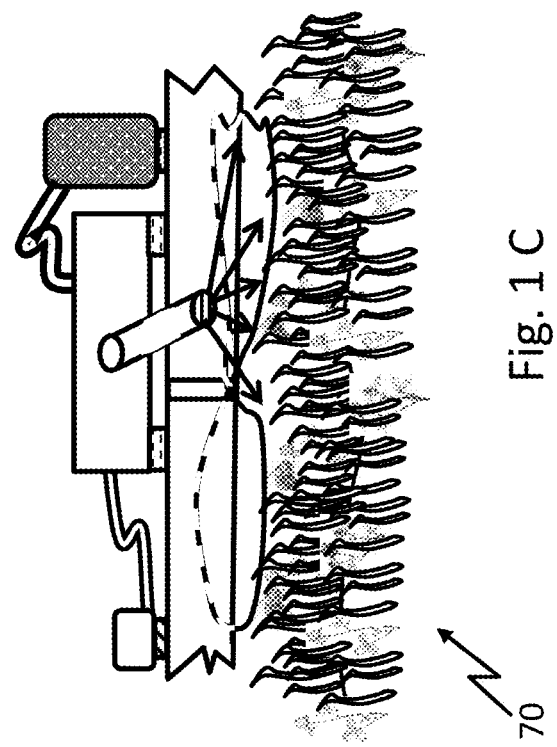
Fig. 1C
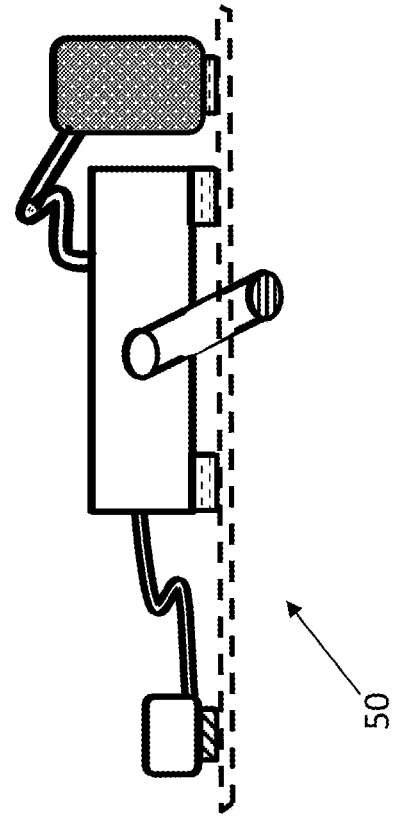
Fig. 1B
Fig. 1

Examples of Typical Means for Diverting

1. Mechanical devices 31 – connection, deflection angle
   A. Plows 32
   B. Prongs 33
   C. Sleigh rails 34

2. Light Devices 51 – connection, power, lens/diffuser, light source, controller
   A. Ultraviolet 52
   B. Infrared 53
   C. Laser 54
   D. Strobe 55

3. Sound 56 – connection, power, sound director/ horn, sound source, controller
   A. Low Frequency 57
   B. High Frequency 58
   C. Staccato 59

4. Other 93 – connection, power, source, guider, controller,
   A. Carbon Dioxide 94 – $CO_2$ source, pressure, nozzle
   B. Smoke 95 – source, nozzle
   C. Pheromonal substance 96 – pheromon source, pressure, nozzle
   D. Electro Magnetic pulses 97 – EMF source
   E. Pneumatic pulses 98 - source, pressure, nozzle
   F. Waterborne chemical sprays 99 - source, pressure, nozzle

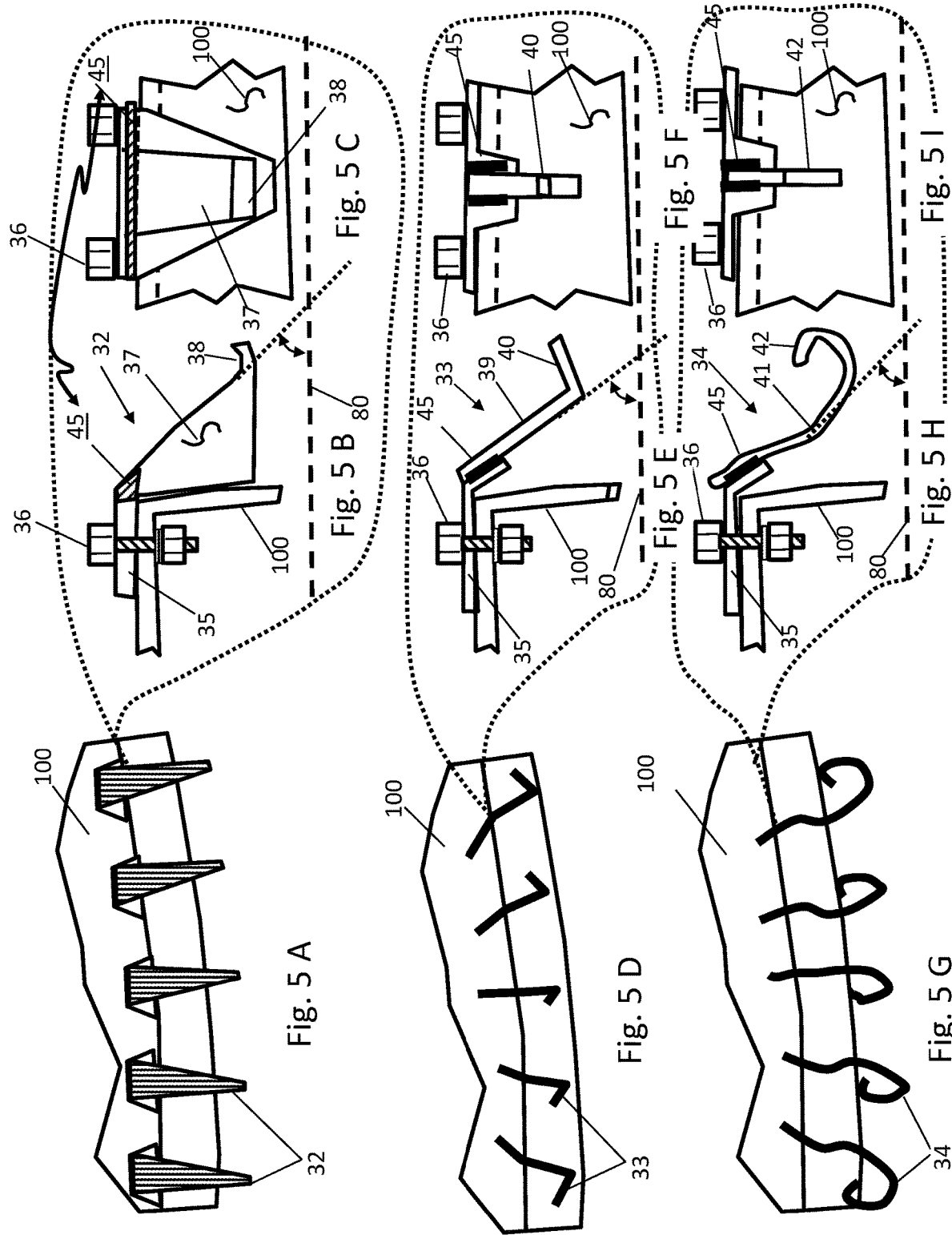

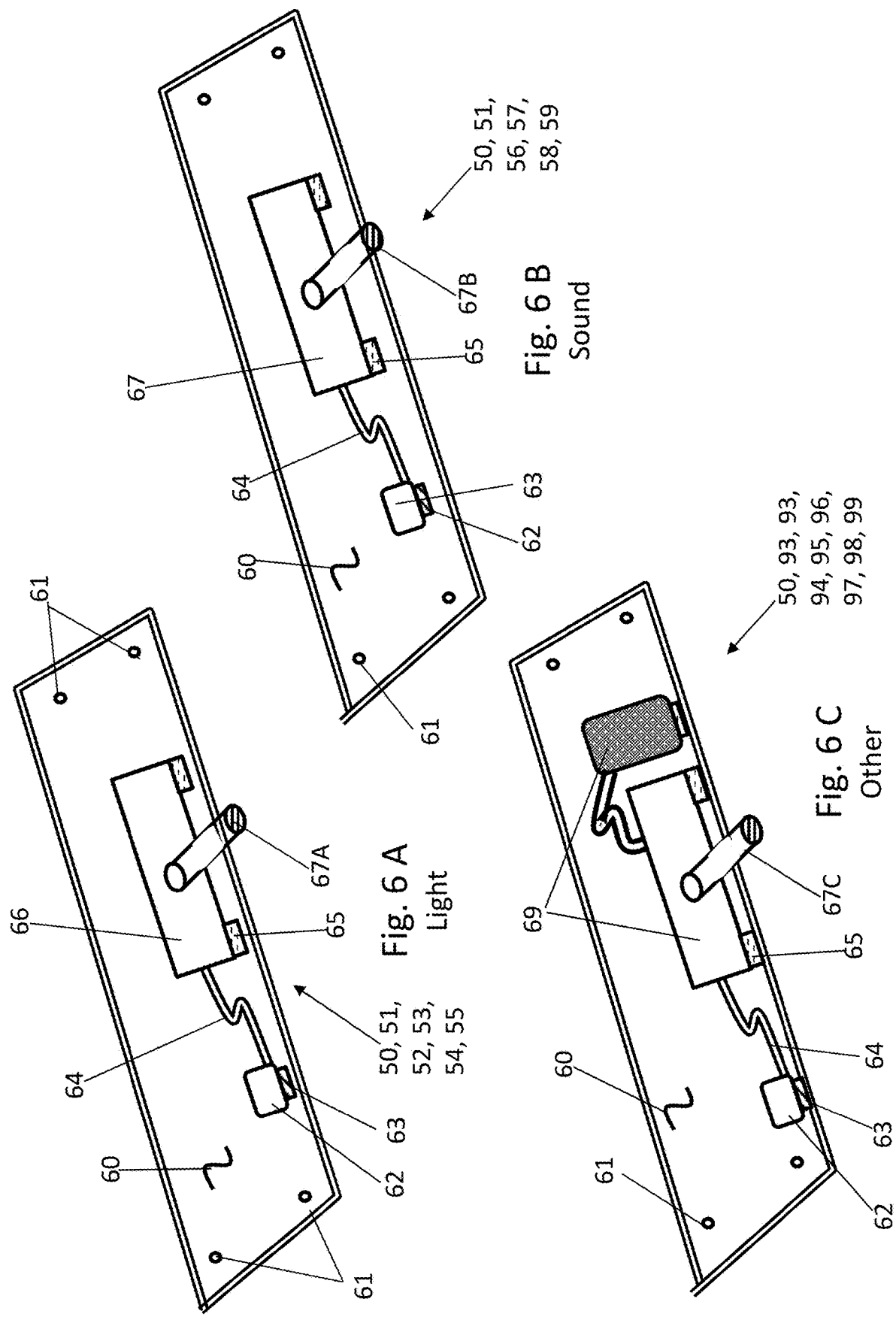

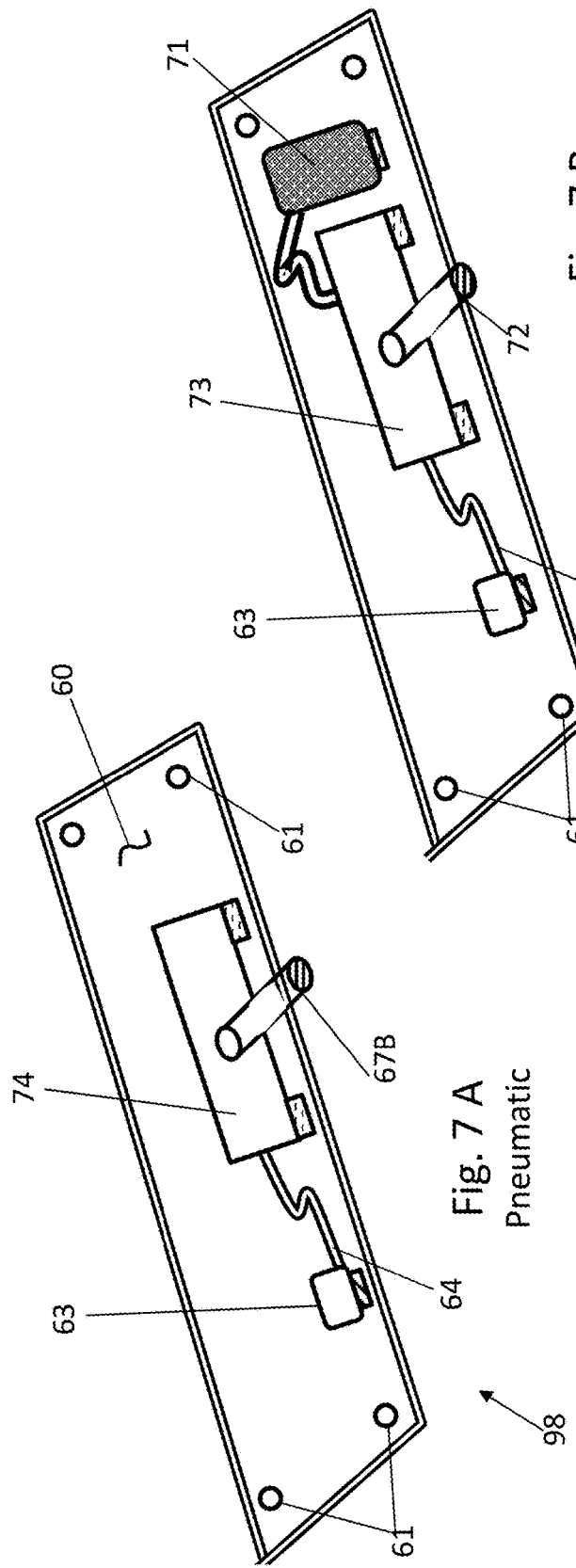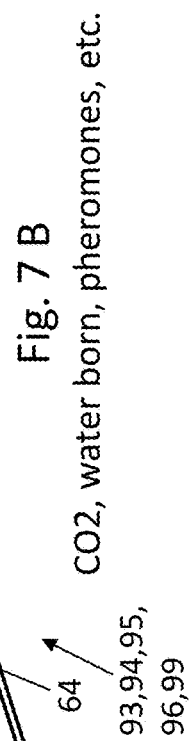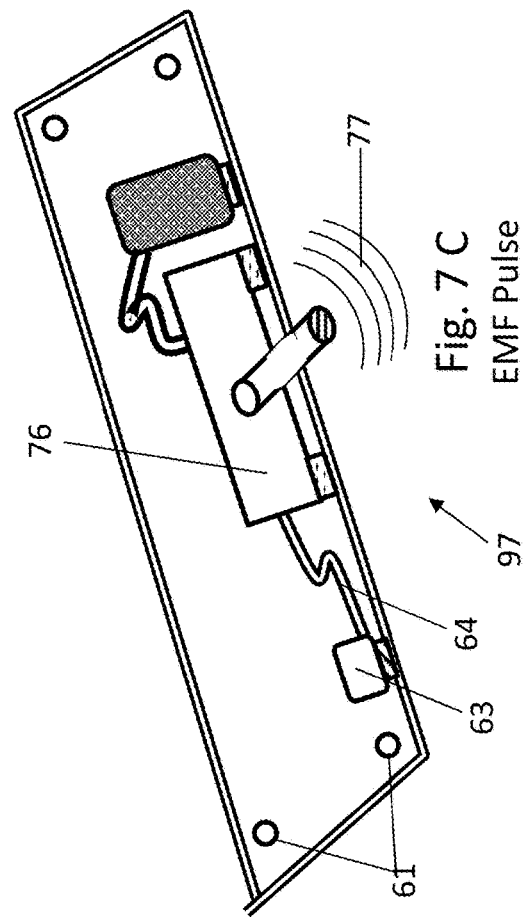
Fig. 7 B
CO2, water born, pheromones, etc.
Fig. 7 A
Pneumatic
Fig. 7 C
EMF Pulse
Fig. 7

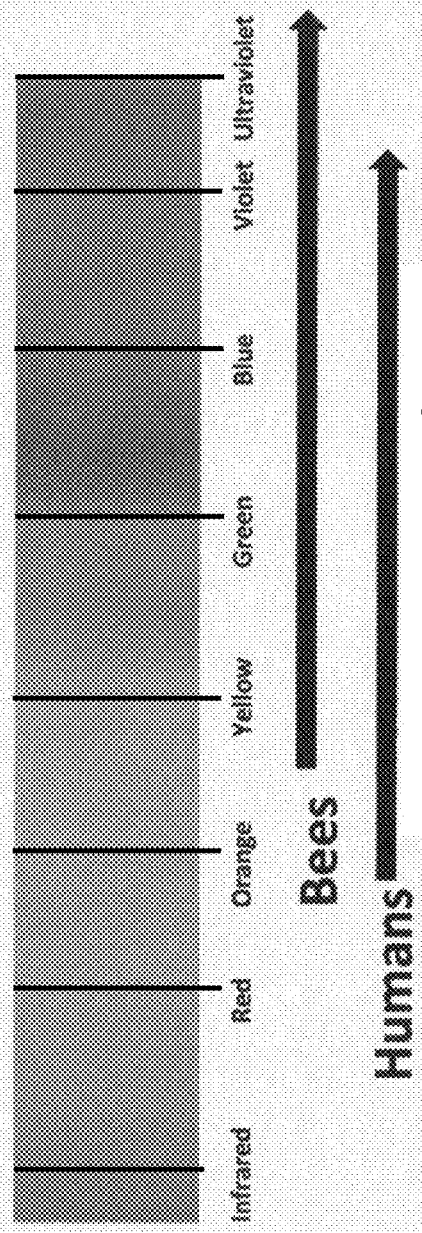
Fig. 10 A – Colors/Light
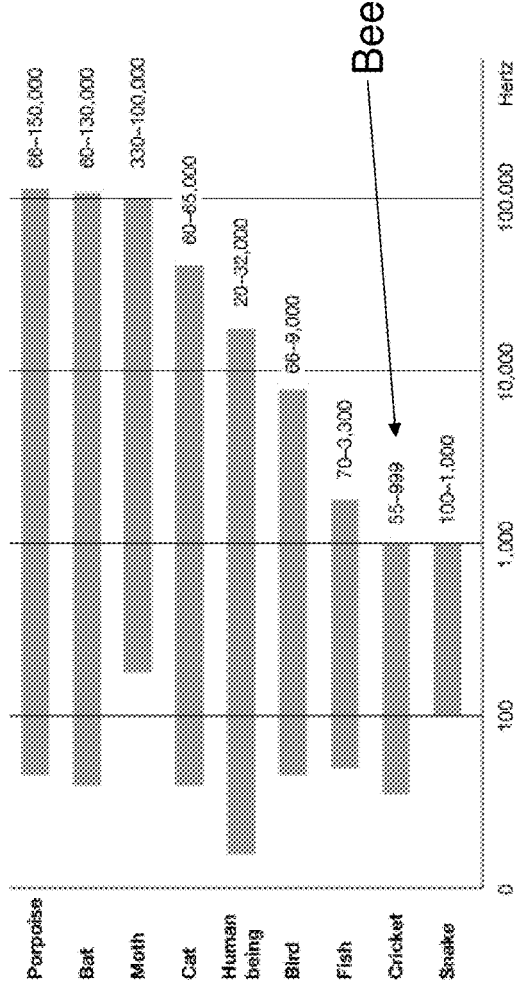
Fig. 10 B Sound

LAWN MOWER PLOW OR ACCESSORY WARNING DEVICE FOR DIVERTING AND SAVING HONEY BEES AND OTHER ENDANGERED INSECTS

CROSS-REFERENCE TO RELATED APPLICATIONS

None.

FIELD OF INVENTION

This invention relates to a special and unique lawn mower device that is a set of small, mower deck mounted mechanical plows or accessory warning devices for diverting and saving honey bees and other endangered insects. Particularly this device or system is related to a warning mechanism to achieve the attention of bees and other insects and divert them from the dangers of an oncoming mowing device or the like. Alternative devices for warning are sound, light, smoke, spray and Electro Magnetic force/pulse generators placed with the mowers. These devices are collectively called the Zee Farmer bee guard.

The Lawn mower plow or accessory warning device is a readily made and available device that is secured to the zero turn or bat-wing multiple mower decks and affords the bees a warning of the dangers of an oncoming mower. The applications anticipate original equipment with new mowers and lawn equipment or after-market sales of the devices for existing mowers and equipment.

FEDERALLY SPONSORED RESEARCH

None.

SEQUENCE LISTING OR PROGRAM

None.

BACKGROUND

Field of Invention and Prior Art

As far as known, there are no lawn mower small, mower deck mounted mechanical plows or accessory warning devices for diverting and saving honey bees and other endangered insects or similar devices. It is believed that this product is unique in its design and technologies.

Background

This background as to bees and their habitats and customs should be useful in understanding the importance of the small, mower deck mounted mechanical plows or accessory warning devices for diverting and saving honey bees and other endangered insects. Bees play an important role in pollinating flowering plants, and are the major type of pollinator in many ecosystems that contain flowering plants. It is estimated that one third of the human food supply depends on pollination by insects, birds and bats, most of which is accomplished by bees, whether wild or domesticated. From 1972 to 2006, feral honey bees declined dramatically in the US, and they are now almost absent. The number of colonies kept by beekeepers declined slightly, through urbanization, systematic pesticide use, tracheal and Varroa mites, and the closure of beekeeping businesses. In 2006 and 2007 the rate of attrition increased, and was described as colony collapse disorder. In 2010 invertebrate iridescent virus and the fungus Nosema ceranae were shown to be in every killed colony, and deadly in combination. Apart from colony collapse disorder, losses outside the US have been attributed to causes including pesticide seed dressings, such as Clothianidin, Imidacloprid and Thiamethoxam. From 2013 the European Union restricted some pesticides to stop bee populations from declining further. In 2014 the Inter-governmental Panel on Climate Change report warned that bees may face increased risk of extinction because of global warming. Finally, the White Dutch clover has been added to grass seed, commercially sold in America, last several decades is preferred over naturally growing clover here. It keeps broadleaf weeds reduced or "down better". These are large White Dutch clover area are killing zones. In the last 10 years various studies have indicated a decline worldwide where clover is and these zero turn mowers are sold. The mowers are a main problem in the reduction of bee population.

Bees are tying insects closely related to wasps and ants, known for their role in pollination and, in the case of the best known bee species, the European honey bee, for producing honey and beeswax. The three types of honey bees in a hive are (queens (egg-producers), workers (non-reproducing females), and drones (males whose main duty is to find and mate with a queen). Solitary bees are important pollinators; they gather pollen to provision their nests with food for their brood. Often it is mixed with nectar to form a paste-like consistency. Some solitary bees have advanced types of pollen-carrying structures on their bodies. Bees are a monophyletic lineage within the superfamily Apoidea and are presently considered a clade, called Anthophila. There are nearly 20,000 known species of bees in seven recognized biological families. They are found on every continent except Antarctica and in every habitat on the planet that containsinse—pollinated flowering plants. Some species including honey bees, bumblebees, and stingless bees live socially in colonies. Bees are adapted for feeding on nectar and pollen, the former primarily as an energy source and the latter primarily for protein and other nutrients. Most bees are polylectic (generalist) meaning they collect pollen from a range of flowering plants, however, some are oligoleges (specialists), in that they only gather pollen from one or a few species or genera of closely related plants. Specialist pollinators also include bee species which gather floral oils instead of pollen, and male orchid bees, which gather aromatic compounds from orchids (one of the few cases where male bees are effective pollinators). Bees are able to sense the presence of desirable flowers through ultraviolet patterning on flowers, floral odors, and even electromagnetic fields. Once landed, a bee then uses nectar quality and pollen taste to determine whether to continue visiting similar flowers. Most pollen is used as food for larvae. Bee pollination is important both ecologically and commercially; the decline in wild bees has increased the value of pollination by commercially managed hives of honey bees.

Bees see all colors except the color red. That and their sense of smell help them find the flowers they need to collect pollen. Not only is pollen a food source for bees, but also some of the pollen is dropped in flight, resulting in cross pollination. The relationship between the plant and the insect called symbiosis. A bee has a pair of large compound eyes which cover much of the surface of the head. Between and above these are three small simple eyes (ocelli) which provide information for the bee on light intensity. The antennae usually have thirteen segments in males and twelve in females and are geniculate, having an elbow joint part way along. They house large numbers of sense organs that can detect touch (mechanoreceptors), smell and taste, and small, hair-like mechanoreceptors that can detect air movement so as to "hear" sounds. The mouthparts are adapted for both chewing and sucking by having both a pair of mandibles and a long proboscis for sucking up nectar.

Often Beekeepers use smoke to calm bees when they are collecting honey or relocating a hive. Noise and acoustic sounds can impact bee behavior. In D'Arcy Thompson's translation: "At early dawn they make no noise, until someone particular bee makes a buzzing noise two or three times and thereby awakes the rest; hereupon they all fly in a body to work. By and by they return and at first are noisy; . . . until at last someone bee flies round about, making a buzzing noise, and apparently calling on the others to go to sleep".

Problem Solved

The last 10 years have noticed decline worldwide where clover is and these zero turn mowers are sold. The improvement and problem solved as to bee population is to provide a small, mower deck mounted mechanical plows or accessory warning devices for diverting and saving honey bees and other endangered insects. Alternative means to alert such as sound, light and electromagnetic forces are also anticipated as a solution to killing the bees with the fast mowers of today.

SUMMARY OF THE INVENTION

This invention is a lawn mower plow or accessory warning device for diverting and saving honey bees and other endangered insects. Alternative mechanical designs and light, sound, electro-magnetic force and spray devices are shown as alternative embodiments.

The preferred embodiment of a lawn mower plow or accessory warning device for diverting and saving honey bees and other endangered insects is comprised of: a mower deck mounted accessory warning device for diverting and saving a group of pollinating honey bees and other endangered insects, the device made of durable materials and comprised of: (a) a plate for removably securing the warning device to the mower deck; (b) a means for removably connecting and securing the plate to the deck; (c) a warning emitter; and (d) a means for securing a warning emitter to the plate wherein the warning device alerts the pollinating bees of the oncoming mower so the bees can survive by flying away and averting their demise by the mower. Alternative devices for warning are sound, light, smoke, spray and Electro Magnetic force/pulse generators placed with the mowers.

The newly invented lawn mower plow or accessory warning device for diverting and saving honey bees and other endangered insects can be manufactured at low volumes by very simple means and in high volume production by more complex and controlled systems.

Objects and Advantages

There are several objects and advantages of the small, mower deck mounted mechanical plows or accessory warning devices for diverting and saving honey bees and other endangered insects. There are currently no known devices that are effective at providing the objects of this invention. These devices, based on a novelty search, have no other devices that anticipate nor render obvious this solution to the mowing deaths of the bee population.

The Zee Farmer bee guard device has various advantages and benefits:

| Item | Advantages |
| --- | --- |
| 1 | Is a universal design for attachments to zero turn, bat-wing multiple mower devices, and other current and future mower devices |
| 2 | Is comprised of parts to create bee diversion and distraction devices that are already produced - the components need to be adapted to mowing devices |
| 3 | Is environmentally safe for other plants, insects, humans and animals |
| 4 | Can be used by commercial and private lawn care personnel |
| 5 | Is adaptable for mechanical, light, sound, electromagnetic forces, pneumatic pulses, and chemical deterrent means. |
| 6 | Provides a device to help lessen the loss of honey bees and other insects due to grass mowing while bees are pollinating |
| 7 | Promotes the elimination of colony collapse disorder by preserving enough bees to keep the hive alive and productive |

Finally, other advantages and additional features of the present lawn mower plow or accessory warning device—for diverting and saving honey bees and other endangered insects—will be more apparent from the accompanying drawings and from the full description of the device. For one skilled in the art of bee preservation and protection of insects important to the ecological balance of nature, it is readily understood that the features shown in the examples with this product are readily adapted to other types of out bee protection systems and devices.

DESCRIPTION OF THE DRAWINGS—FIGURES

The accompanying drawings, which are incorporated in and constitute a part of this specification, illustrate an embodiment of the small, mower deck mounted mechanical plows or accessory warning devices for diverting and saving honey bees and other endangered insects for various applications device that is preferred. The drawings together with the summary description given above and a detailed description given below serve to explain the principles of the Zee Farmer bee guard device. It is understood, however, that this warning device is not limited to only the precise arrangements and instrumentalities shown.

FIGS. 1A through 1C are sketches of the general lawn mower diversion device for warning honey bees of oncoming mowers.

FIG. 4 is a list of typical means for diverting bees from mower devices.

FIGS. 5A through 5I are sketches of physical/mechanical diversion devices to warn pollenating bees of an approaching mower.

FIGS. 6A through 6C are sketches of mower accessories using various diversion means.

FIGS. 7A through 7C are more sketches of mower accessories using various diversion means.

FIGS. 10A and 10B are a sketch of the color spectrum and human versus bee vision plus a comparison sound/hearing chart.

DESCRIPTION OF THE DRAWINGS—REFERENCE NUMERALS

Figure 2:
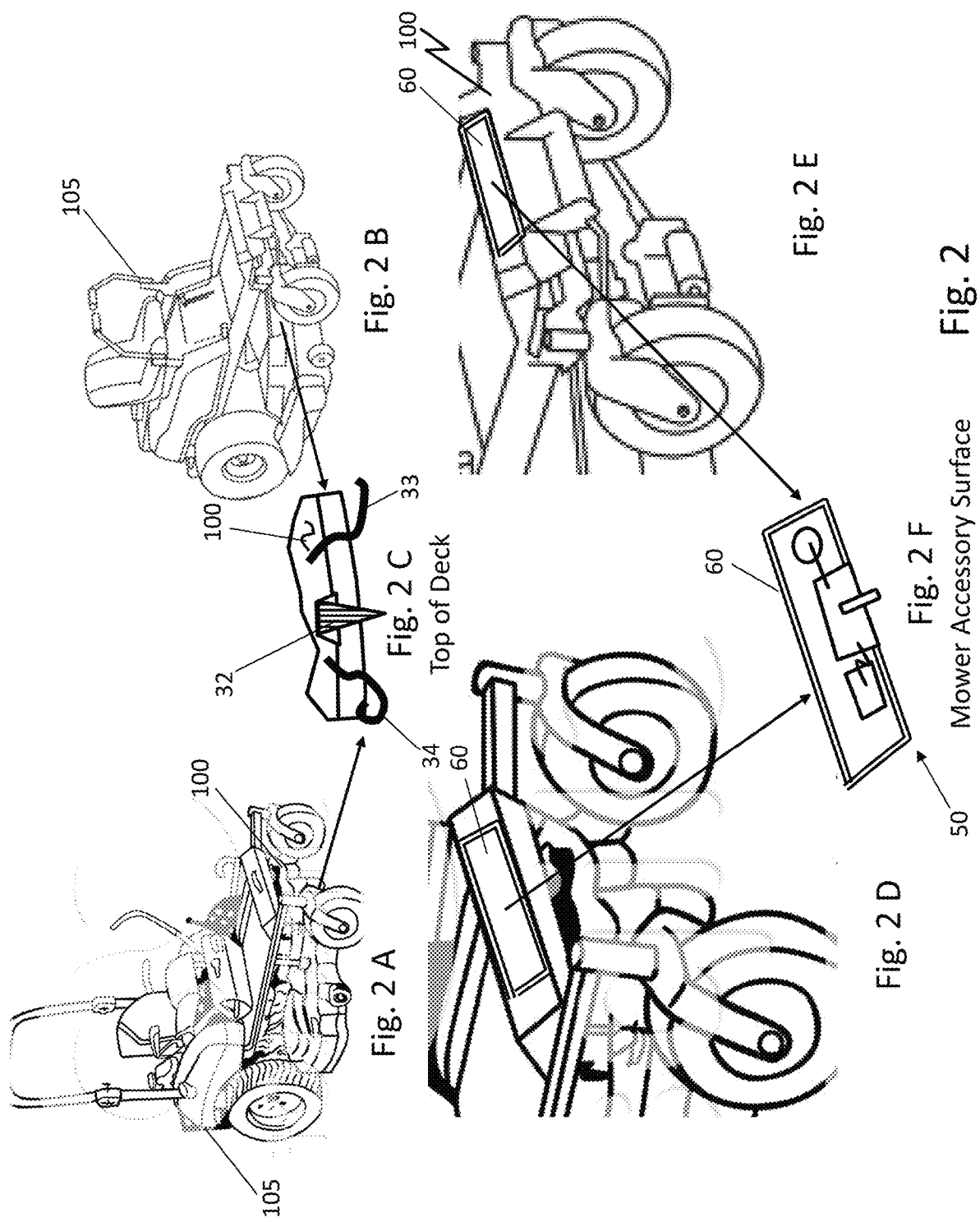
FIGS. 2A through 2F are sketches of the general bee diversion device being mounted to mowers.
Figure 3:
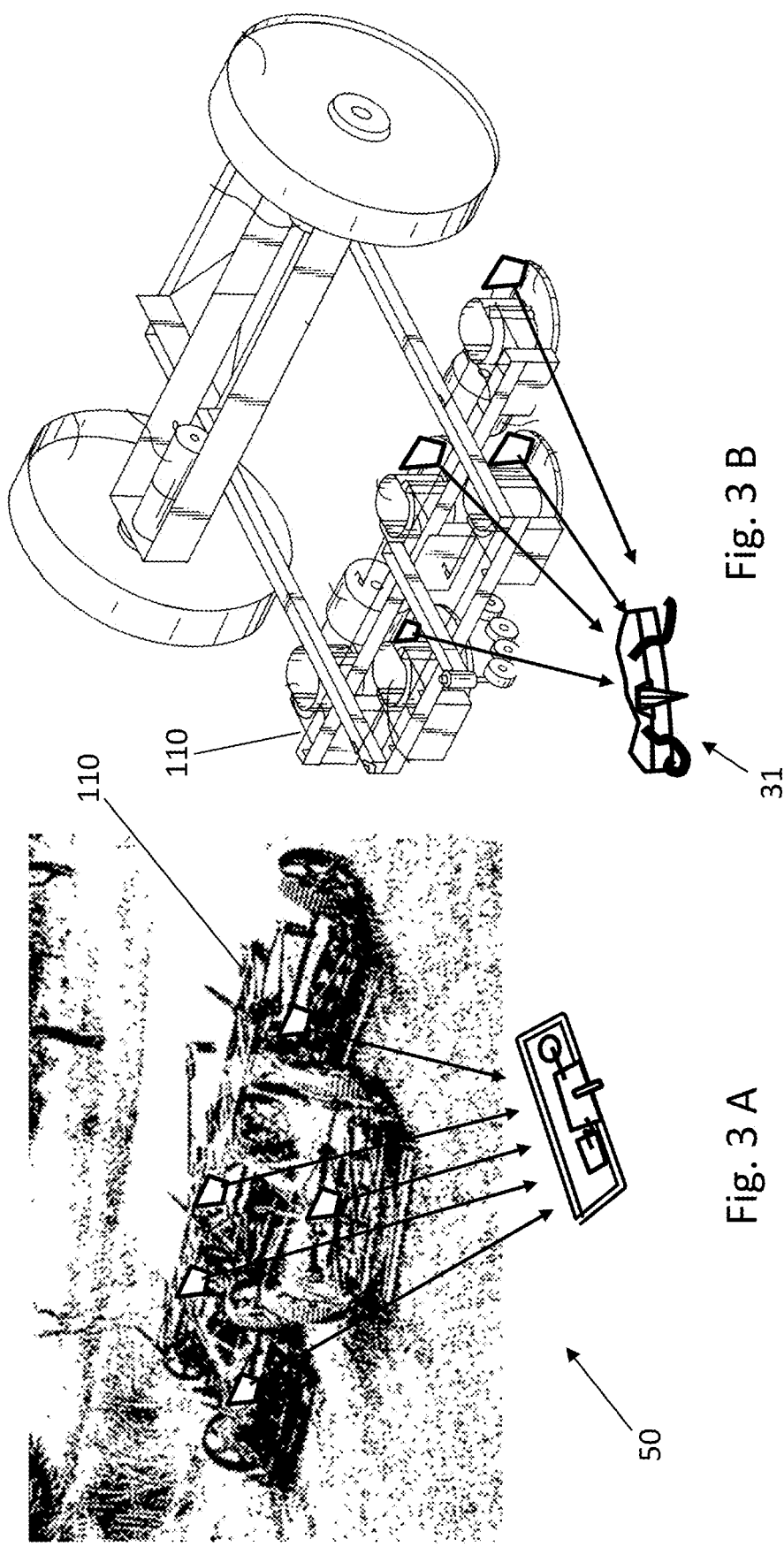
FIGS. 3A and 3B are sketches of the bee diversion device mounting to gang and bat wing mowers.

The following list refers to the drawings:

TABLE B

Reference numbers

| Ref # | Description |
|---|---|
| 30 | Bee diversion device 30 for lawn mower |
| 31 | Physical/mechanical bee diversion device 31 with a warning emitter (protrusion) |
| 32 | Plow diversion device 32 |
| 33 | Slat diversion device 33 |
| 34 | Rod diversion device 34 |
| 35 | Plate 35 for physical device 31 |
| 36 | Means 36 for removably fastening physical device to mower deck such as threaded fasteners, pins, clips, rivets, zip ties, etc. |
| 37 | Extension plow 37 |
| 38 | Return on kick-up 38 to prevent device 31 from engaging the ground |
| 39 | Extension slat 39 |
| 40 | Return kick up 40 of slat 39 |
| 41 | Extension rod 41 |
| 42 | Return kick up 42 of rod 41 |
| 45 | Means 45 to secure physical means 31 to plate 35 such as welding, integral molding, casting, epoxy adhesives etc. |
| 50 | Non-mechanical means 50 for diverting bees with a warning emitter |
| 51 | Light devices 51 for diverting bees |
| 52 | Ultraviolet 52 light devices |
| 53 | Infrared 53 light device |
| 54 | Laser 54 light device |
| 55 | Strobe 55 light device |
| 56 | Sound 56 diversion device |
| 57 | Low frequency 57 sound diversion device |
| 58 | High frequency 58 sound diversion device |
| 59 | Staccato sound 59 sound diversion device |
| 60 | Base plate 60 to removably secure and mount nonphysical means 50 to mower deck 100 means from |
| 61 | Fastening 61 base plate 60 to deck 100 |
| 62 | Power source 62 battery, solar, etc. |
| 63 | Means 63 to secure power source to base 60 |
| 64 | Conductors 64 from power source to using device |
| 65 | Means to mount 65 light source on some other to plate 60 |
| 66 | Light source for various types ultraviolet 52 infrareds 53 laser 54, and strobe 55 |
| 67 | Sound source 67 for various types low frequency 57, high frequency 58, staccato 59 |
| 67A | Light emitter lenses 67A |
| 67B | sound diverter speaker 67B |
| 67C | Other directional focus component 67C |
| 68 | List 68 of examples of means to divert |
| 69 | Other diversion sources 69 |
| 70 | Operation 70 of bee diversion device 30 in the grass 81 |
| 71 | CO2, pheromone, smoke, water/water born origin warning means 71 |
| 72 | CO2 nozzle 72 |
| 73 | CO2 expansion and controller box 73 |
| 74 | Air/pneumatic source and controller 74 |
| 75 | Bee vision vs human vision chart 75 |
| 76 | EMF pulse generator 76 |
| 77 | EMF pulse 77 |
| 78 | Bee hearing vs other animal hearing chart 78 |
| 80 | Ground 80 |
| 81 | Grass and vegetation 81 to be mowed |
| 85 | Clover and desired vegetation 85 for pollenating |

TABLE B-continued

Reference numbers

| Ref # | Description |
|---|---|
| 88 | Pollenating bees 88 |
| 90 | Moving ground 90 with diverting 30 |
| 93 | Other diversion devices 93 |
| 94 | Carbon dioxide 94 diversion device |
| 95 | Smoke diversion and warning devices 95 |
| 96 | Pheromone 96 diversion device |
| 97 | Electromagnetic pulse 97 diverter device |
| 98 | Pneumatic pulse 98 |
| 99 | Chemical and water spray 99 |
| 100 | Mower deck 100 |
| 105 | Mower 105 |
| 107 | Mower blades 107 - rotating which kills pollenating bees 88 |
| 110 | Gang or bat wing 110 multiple mower devices |

DETAILED DESCRIPTION OF PERFERRED EMBODIMENT

The present development is a small, mower deck mounted mechanical plows or other accessory warning devices for diverting and saving honey bees and other endangered insects. This invention relates to a special and unique lawn mower device that is a set of small, mower deck mounted mechanical plows or accessory warning devices for diverting and saving honey bees and other endangered insects. Particularly this device or system is related to a warning mechanism to achieve the attention of bees and other insects and divert them from the dangers of an oncoming mowing device or the like. Alternative devices for warning are sound, light, smoke, spray and Electro Magnetic force/pulse generators placed with the mowers. These devices are collectively called the Zee Farmer bee guard.

The advantages for the small, mower deck mounted mechanical plows or accessory warning devices 30 for diverting and saving honey bees and other endangered insects device are listed above in the introduction. Succinctly the benefits are that the device:

Is a universal design for attachments to zero turn, batwing multiple mower devices, and other current and future mower devices;

Is comprised of parts to create bee diversion and distraction devices that are already produced—the components need to be adapted to mowing devices;

Is environmentally safe for other plants, insects, humans and animals;

Can be used by commercial and private lawn care personnel;

Is adaptable for mechanical, light, sound, electromagnetic forces, pneumatic pulses, and chemical deterrent means;

Provides a device to help lessen the loss of honey bees and other insects due to grass mowing while bees are pollinating; and Promotes the elimination of colony collapse disorder by preserving enough bees to keep the hive alive and productive.

The preferred embodiment of a lawn mower plow or accessory warning device for diverting and saving honey bees and other endangered insects is comprised of: a mower deck mounted accessory warning device for diverting and saving a group of pollinating honey bees and other endangered insects, the device made of durable materials and comprised of: (a) a plate for removably securing the warning device to the mower deck; (b) a means for removably connecting and securing the plate to the deck; (c) a warning emitter; and (d) a means for securing a warning emitter to the plate wherein the warning device alerts the pollinating bees of the oncoming mower so the bees can survive by flying away and averting their demise by the mower. Alternative devices for warning are sound, light, smoke, spray and Electro Magnetic There is shown in FIGS. 1-10 a complete description and operative embodiment of the small, mower deck mounted mechanical plows or accessory warning devices 30 for diverting and saving honey bees. In the drawings and illustrations, one notes well that the FIGS. 1-10 demonstrate the general configuration and use of this product. The various example uses are in the operation and use section, below. It is understood, however, that the device 30 is not limited to only the precise arrangements and instrumentalities shown. Other examples of bee and insect diverting devices and uses are still understood by one skilled in the art of diversion devices to be within the scope and spirit shown here.

FIGS. 1A through 1C are sketches of the general lawn mower diversion device 30 for warning honey bees 88 of on-coming mowers 105. Shown in these sketches are: a bee diversion device 30 for lawn mower; a physical/mechanical bee diversion device 31 with a warning emitter (protrusion); a plow diversion device 32; a non-mechanical means 50 for diverting bees; and an operation 70 of bee diversion device 30 in the grass 81.

FIGS. 2A through 2F are sketches of the general bee diversion device 30 being mounted to mowers 105. These sketches show the following components of the Zee Farmer bee guard: a plow diversion device 32; a slat diversion device 33; a rod diversion device 34; a non-mechanical means 50 for diverting bees; a base plate 60 to removably secure and mount nonphysical means 50 to mower deck 100; a mower deck 100; and a mower 105; a set of mower blades 107—rotating that kills the pollenating bees 88; a gang or bat wing 110 of multiple mower devices.

FIGS. 3A and 3B are sketches of the bee diversion device mounting to gang and bat wing mowers. These sketches depict: a physical/mechanical bee diversion device 31; a non-mechanical means 50 for diverting bees; and a gang or bat wing 110 of multiple mower devices.

FIG. 4 is a chart 68 or list of examples of typical means for diverting bees from mower devices 105. Portrayed in the lists are: a physical/mechanical bee diversion device 31; a plow diversion device 32; a slat diversion device 33; a rod diversion device 34; a light devices 51 for diverting bees; an ultraviolet 52 light devices; an infrared 53 light device; a laser 54 light device; a strobe 55 light device; a sound 56 diversion device; a low frequency 57 sound diversion device; a high frequency 58 sound diversion device; a staccato sound 59 diversion device or thumping impact noise; other diversion devices 93; a carbon dioxide 94 diversion device; a smoke diversion device 95; a pheromone 96 diversion device; an Electromagnetic pulse 97 diverter device; a pneumatic pulse 98; and chemical spray 99 devices.

FIGS. 5A through 5I are sketches of physical/mechanical diversion devices 31 to warn pollenating bees 88 of an approaching mower 105. In these sketch front and side view are shown the following combination of components for a mechanical diverting device 31: a plow diversion device 32; a slat diversion device 33; a rod diversion device 34; a plate 35 for physical device 31; a means 36 for removably fastening physical device to mower deck such as threaded fasteners, pins, rivets, clips, zip ties, etc.; an extension plow 37; a return on kick-up 38 to prevent device 31 from engaging the ground; an extension slat 39; a return kick up 40 of slat 39; an extension rod 41; a return kick up 42 of rod 41; and a means 45 to secure physical means 31 to plate 35 such as welding, integral molding, casting, epoxy adhesives, etc. These physical/mechanical devices can be made of various durable materials such as, for example and not as a limitation, cast metal, aluminum and iron, molded plastics, formed metal, steel, steel alloys, and composite materials, or the like.

FIGS. 6A through 6C are sketches of mower accessories using various diversion means. For these sketches of a bee diversion device 30 for lawn mower, one sees: a non-mechanical means 50 for diverting bees; a light devices 51 for diverting bees; an ultraviolet 52 light devices; an infrared 53 light device; a laser 54 light device; a strobe 55 light device; a sound 56 diversion device; a low frequency 57 sound diversion device; a high frequency 58 sound diversion device; a staccato sound 59 diversion device or thumping impact noise; a base plate 60 to removably secure and mount nonphysical means 50 to mower deck 100; a fastening 61 base plate 60 to deck 100; a power source 62 battery, solar, etc.; a means 63 to secure power source to base 60; a set of electrical conductors 64 from power source to using device; a means to mount 65 light source on some other to plate 60; a light source for various types ultraviolet 52 infrareds 53 laser 54, and strobe 55; a sound source 67 for various types low frequency 57, high frequency 58, staccato 59; etc.; a light emitter lenses 67A; a sound diverter speaker 67B; a group of other directional focus component 67C; a set of other diversion sources 69; other diversion devices 93; a carbon dioxide 94 diversion device; a smoke diversion device 95; a pheromone 96 diversion device; an Electromagnetic pulse 97 diverter device; a pneumatic pulse 98; and a water and chemical spray 99.

FIGS. 7A through 7C are more sketches of mower accessories using various diversion means. These sketches show: a base plate 60 to removably secure and mount nonphysical means 50 to mower deck 100; a fastening 61 base plate 60 to deck 100; a power source 62 battery, solar, etc.; a means 63 to secure power source to base 60; a set of electrical conductors 64 from power source to using device; a means to mount 65 source on some other to plate 60; a sound source for various types pulses; a sound diverter speaker 67B or projection director of the pulse; a CO2, pheromone, smoke, water/water born origin 71; a CO2 nozzle 72; a CO2 expansion and controller box 73; an air/pneumatic source and controller 74; an electro-magnetic (EMF) pulse generator 76; an EMF pulse 77; other diversion devices 93; a carbon dioxide 94 diversion device; a smoke diversion device 95; a pheromone 96 diversion device; an Electromagnetic pulse 97 diverter device; and a pneumatic pulse 98.

Figure 8:
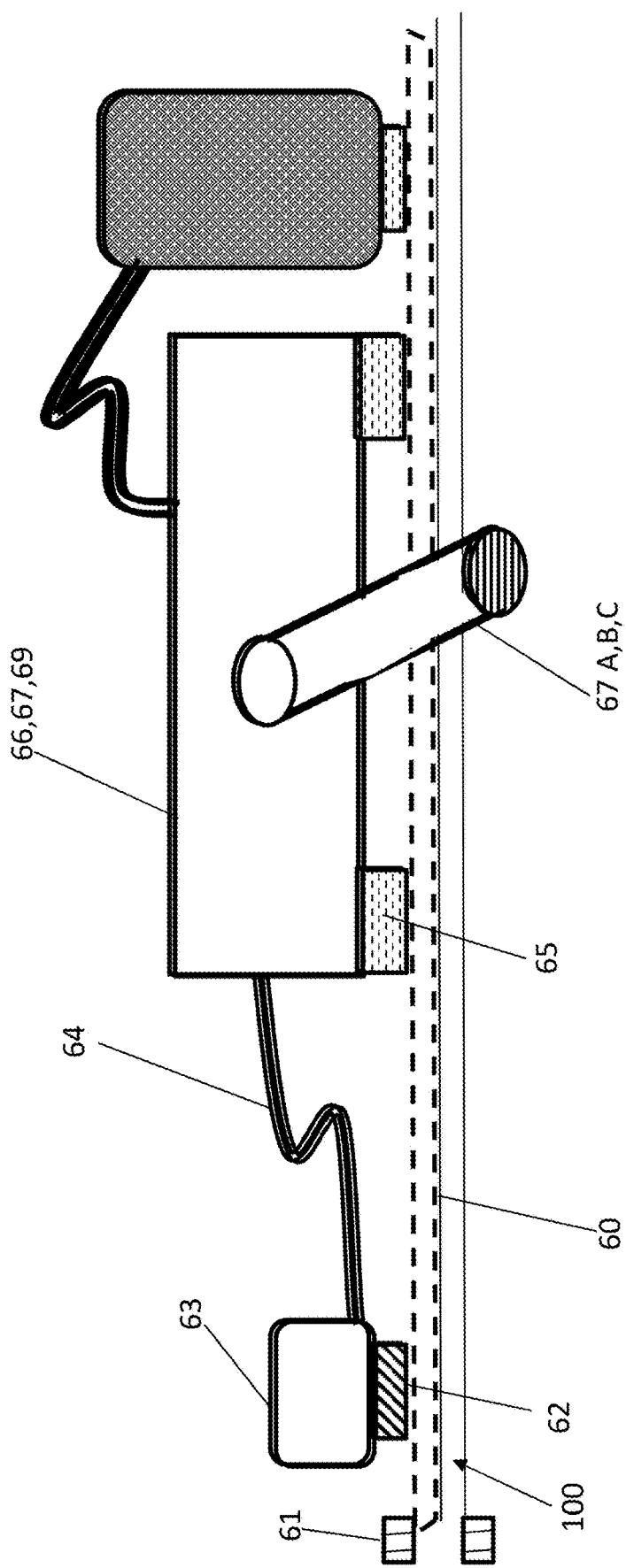
FIG. 8 is a sketch of non-physical diversion systems for warning bees of an approaching mower.

FIG. 8 is a sketch of non-physical diversion systems for warning bees of an approaching mower. This sketch shows and depicts: a base plate 60 to removably secure and mount nonphysical means 50 to mower deck 100; a fastening 61 base plate 60 to deck 100; a power source 62 battery, solar, etc.; a means 63 to secure power source to base 60; a set of electrical conductors 64 from power source to using device; a means to mount 65 light source on some other to plate 60; a light source 66 for various types ultraviolet 52 infrareds 53 laser 54, and strobe 55; a sound source 67 for various types low frequency 57, high frequency 58, staccato 59; etc.; a light emitter lenses 67A; a sound diverter speaker 67B; a group of other directional focus component 67C; and a mower deck 100.

Figure 9:
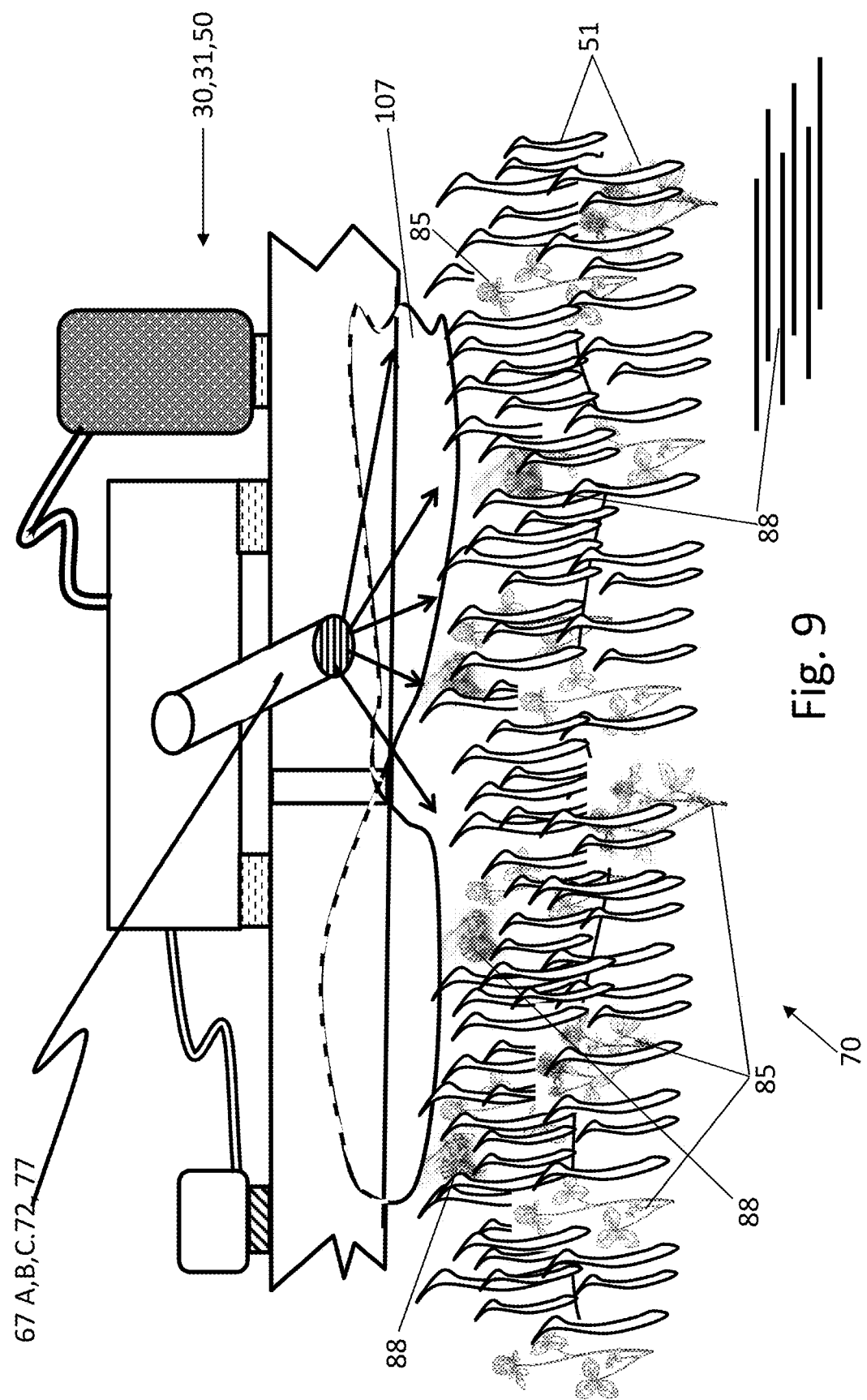
FIG. 9 is a sketch of a mower diverter in operation warning the pollination bees.

FIG. 9 is a sketch of a mower diverter in operation warning the pollination bees. This is described below in the operations section.

FIGS. 10A and 10B are a sketch of the color spectrum and human versus bee vision plus a comparison sound/hearing chart. Shown are a bee vision vs human vision chart 75 and a bee hearing vs other animal hearing chart 78. As to color and light, objects, including living organisms, emit energy as electromagnetic radiation (heat) and light. The full range of wavelengths, extending from gamma rays to long radio waves, is referred to as the electromagnetic spectrum. Colors that humans see are only a very small part of the light spectrum. Humans base their color combinations on red, blue and green, while bees base their colors on ultraviolet light, blue and green. This is the reason why bees can't see the color red. They don't have a photoreceptor for it. They can, however, see reddish wavelengths, such as blue, violet, and orange. They can also see blue-green, blue, violet, and "bee's purple." Bee's purple is a combination of yellow and ultraviolet light. That why humans can't see it. The most, likely colors to attract bees, according to scientists, are purple, violet, and blue. Bees also have the ability to see color much faster than humans. Their color vision is the fastest in the animal world-five times faster than humans. The remarkable eyesight of bees has long been a source of fascination in the scientific community. A hundred years ago, Nobel Prize-winning scientist Karl von Frisch proved that bees can see color. The color humans see is based upon how a pigment absorbs and reflects light. When light hits an object some is absorbed and some is reflected. Our eyes perceive the reflected portion as color. The brilliant color in flowers is a way of attracting pollinators, such as bees. The colors of flowers help target the areas of nectar, the reason why petals are usually a different color than leaves. Even though humans can see more colors, bees have a much broader range of color vision. Their ability to see ultraviolet light gives them an advantage when seeking nectar. Many patterns on flowers are invisible to humans. These nectar "bulls-eye" are visible only to animals, such as bees, that have the ability to see ultra-violet light. This "bee vision" makes finding nectar much easier. In fact, some flowers such as sunflowers, primroses and pansies have nectar guides that can only be seen in ultra violet light. Bees are able to sense the presence of desirable flowers through ultraviolet patterning on flowers, floral odors, and even electromagnetic fields.

As to sounds, bees house large numbers of sense organs that can detect touch (mechanoreceptors), smell and taste, and small, hair like mechanoreceptors that can detect air movement so as to "hear" sounds. The hearing property of human ear is limited. Human ear can perceive sound with in a frequency range of 20 Hz to 20 kHz. The sound frequency below 20 Hz is Infrasonic sound and above 20 kHz is Ultrasonic (US) sound. Human ear is not sensitive to US because the eardrum cannot vibrate as fast as US. Ultrasound has high freqency, so the wave is very powerful. US travel along straight line even in the presence of obstacles. When the US hits an object, it bends and round and spread in all directions.

The details mentioned here are exemplary and not limiting. Other specific components and manners specific to describing a small, mower deck mounted mechanical plows or accessory warning devices 30 for diverting and saving honey bees and other endangered insects can be added as a person having ordinary skill in the field of the art of insect diversion devices and systems and their uses well appreciates.

Operation of the Preferred Embodiment

The small, mower deck mounted mechanical plows or accessory warning devices 30 for diverting and saving honey bees and other endangered insects has been described in the above embodiment. The manner of how the device operates is described below. One notes well that the description above and the operation described here must be taken together to fully illustrate the concept of the bee diverting device 30.

The preferred embodiment of a lawn mower plow or accessory warning device 30 for diverting and saving honey bees and other endangered insects is comprised of: a mower deck mounted accessory warning device for diverting and saving a group of pollinating honey bees and other endangered insects, the device made of durable materials and comprised of: (a) a plate for removably securing the warning device to the mower deck; (b) a means for removably connecting and securing the plate to the deck; (c) a warning emitter; and (d) a means for securing a warning emitter to the plate wherein the warning device alerts the pollinating bees of the oncoming mower so the bees can survive by flying away and averting their demise by the mower. Alternative devices for warning are sound, light, smoke, spray and Electro Magnetic force/pulse generators placed with the mowers.

FIG. 9 is a sketch of a mower diverter in operation warning the pollination bees. The mower 105 with the deck 100 has a bee diversion device 30 mounted and ready for an operational mode. Note the mechanical bee diversion device 31 or a non-mechanical means 50 for diverting bees is shown with the emitter warning component 67A, B, C, 72, 77. The warning emits toward the bees 88. The bees 88 are near the clover 85 and down near the ground 80 in the grass and vegetation 81 to be mowed. An amount of clover and desired vegetation 85 for pollenating is sought by the group of pollenating bees 88. As the mowing the ground operation 90 with a diverting device 30 draws near, a mower deck 100 of the mower 105 with a set of mower blades 107 are rotating. This is what kills the pollenating bees 88. As the warning is emitted, the bees 88 react and fly from the danger before being killed by the mowing operation.

With this description it is to be understood that the small, mower deck mounted mechanical plows or accessory warning devices for diverting and saving honey bees is not to be limited to only the disclosed embodiment of product. The features of the Zee Farmer bee guard device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. An accessory warning device (30) for diverting and saving a group of pollinating honeybees and other endangered insects, the warning device being mounted to a top deck of a mower, being made of durable materials, and being comprised of:
   (a) at least one rigid bee diversion device (31) with an attached mounting plate (35) for removably securing the warning device (30) to the top of the mower deck (100) and angling downwardly toward a ground (80) forming an acute angle with the said ground;
   (b) a means (45) for fixedly connecting and securing the attached mounting plate (35) of the rigid bee diversion device (31) to the mower deck (100); and
   (c) a means (36) for securing the at least one rigid bee diversion device (31) to the plate (35)
wherein the warning device (30) alerts the pollinating bees of the oncoming mower by spreading the grass and deflecting a body of the pollinating bee so the bees can survive by flying away and averting their demise by the mower.

2. The mower deck mounted accessory warning device (30) according to claim 1 wherein the durable materials for the warning device are selected from the group consisting of cast metal, cast aluminum, cast iron, molded plastics, formed metal, formed steel, formed steel alloys, and composite materials.

3. The mower deck mounted accessory warning device (30) according to claim 1 wherein the means (36) for removably connecting and securing the plate (35) to the mower deck (100) is selected from the group consisting of threaded fasteners, clips, pins, and zip ties.

4. The mower deck mounted accessory warning device (30) according to claim 1 wherein the means (45) for securing the at least one rigid bee diversion device (31) to the attached mounting plate (35) is selected from the group consisting of welding, integral molding, integral casting, and epoxy adhesives.

5. The mower deck mounted accessory warning device according to claim 1 wherein the at least one the rigid bee diversion device (31) is a physical and mechanical bee diversion device (31).

6. The warning device according to claim 5 wherein the at least one rigid bee diversion device (31) is a small diverting plow device (32) having a rigid extension (37) angled down from and connected to the plate (35) with a kick-up (38) near the ground and opposite of the plate (35).

7. A mower deck mounted accessory warning device (30) for diverting and saving a group of pollinating honeybees and other endangered insects, the warning device being mounted to a top deck of a mower, being made of durable materials, and being comprised of:
   (a) at least one rigid, mechanical protrusion with a plate for removably securing the at least one mechanical protrusion to a top of the mower deck (100) and angling downwardly toward a ground (80) forming an acute angle with the said ground;
   (b) a means for fixedly connecting and securing the plate to the top of the mower deck;
   (c) the at least one mechanical protrusion comprised as an extended member with two ends, an upturned end near the ground and opposite of a secured end; and
   (d) a means for securing the secured end of the extended member to the plate
wherein the at least one rigid, mechanical protrusion from the mower deck alerts the pollinating bees of the oncoming mower by spreading the grass and deflecting a body of the pollinating bee so the bees can survive by flying away and averting their demise by the mower.

* * * * *